Figure 1:
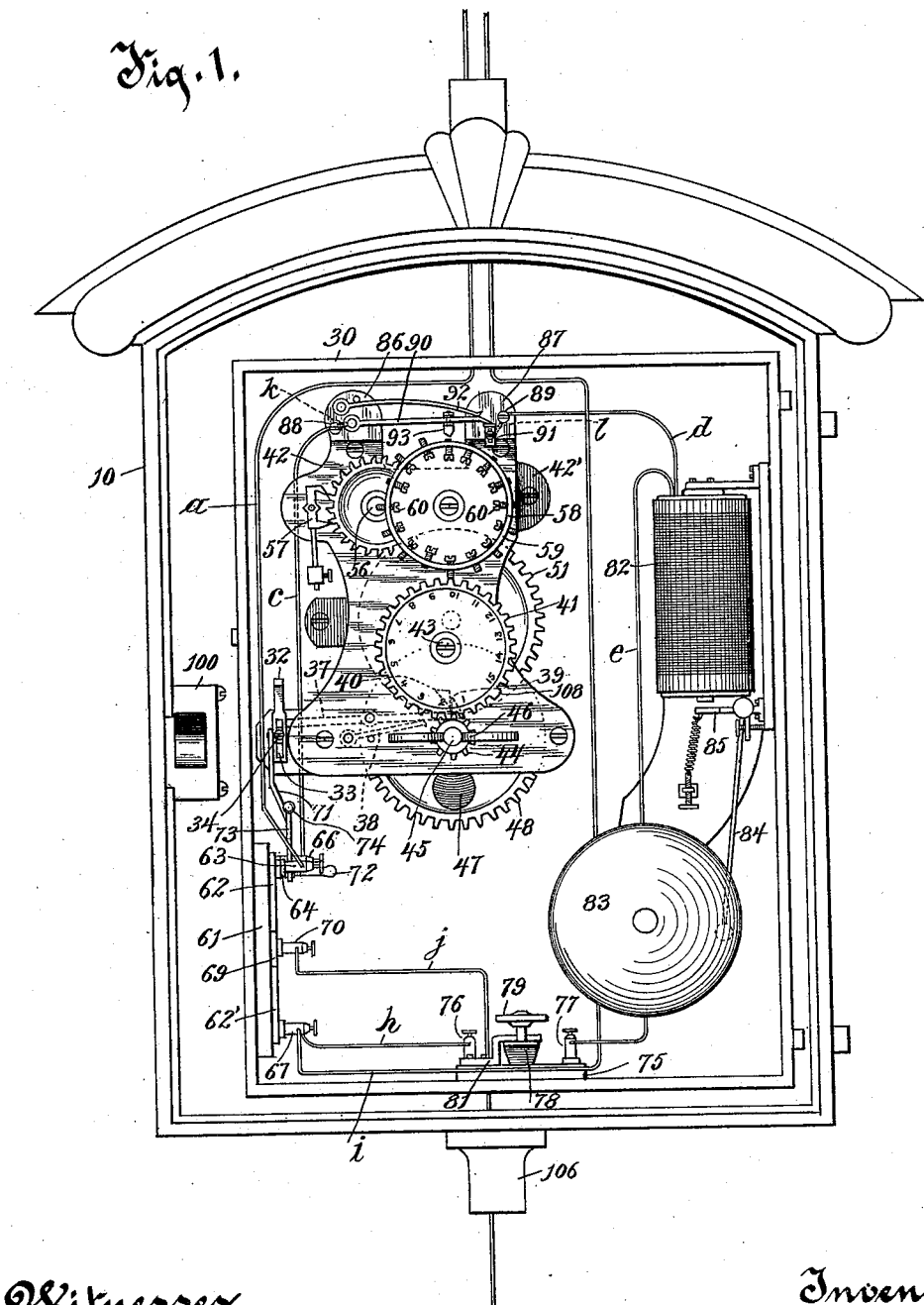

(No Model.) 3 Sheets—Sheet 1.

J. H. HAYES & C. FISHER.
FIRE ALARM BOX.

No. 599,654. Patented Feb. 22, 1898.

Witnesses.

Inventors.
John H. Hayes.
Charles Fisher.
By Benedict & Morsell
Attorneys.

(No Model.)  3 Sheets—Sheet 2.

J. H. HAYES & C. FISHER.
FIRE ALARM BOX.

No. 599,654.  Patented Feb. 22, 1898.

Witnesses.
O. H. Keeney
Anna V. Faust

Inventors.
John H. Hayes
Charles Fisher
By Benedict and Morsell
Attorneys.

(No Model.) 3 Sheets—Sheet 3.
J. H. HAYES & C. FISHER.
FIRE ALARM BOX.
No. 599,654. Patented Feb. 22, 1898.
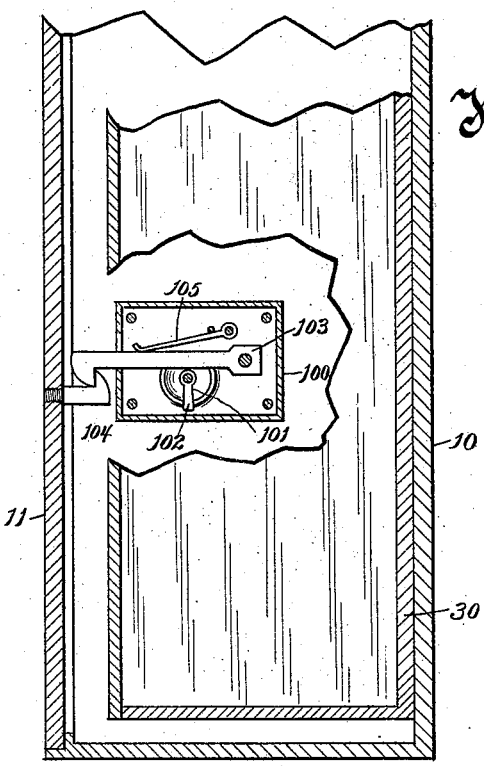
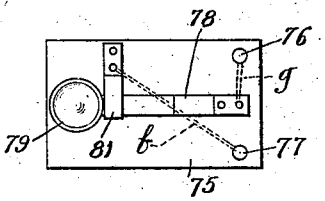
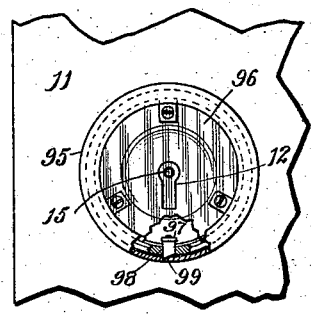
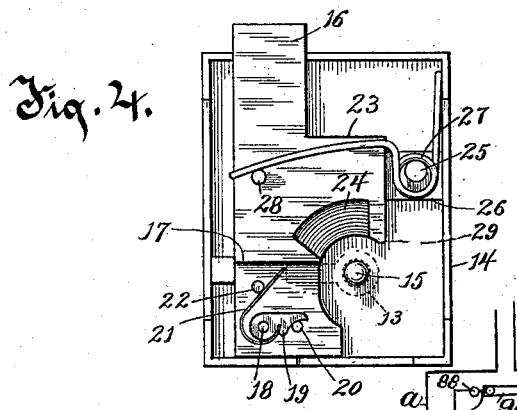
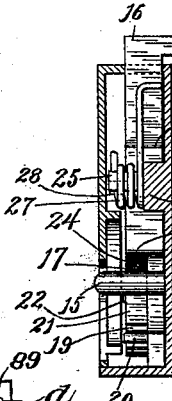
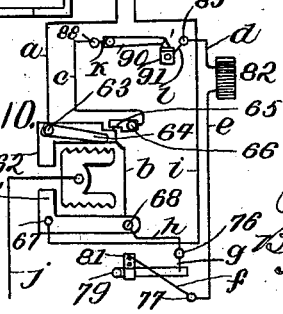
Witnesses:
O. N. Keeney
Anna V. Faust
Inventors
John H. Hayes
Charles Fisher
By Benedict and Morsell
Attorneys.

UNITED STATES PATENT OFFICE.

JOHN H. HAYES, OF APPLETON, WISCONSIN, AND CHARLES FISHER, OF CHICAGO, ILLINOIS.

FIRE-ALARM BOX.

SPECIFICATION forming part of Letters Patent No. 599,654, dated February 22, 1898.

Application filed January 21, 1897. Serial No. 620,065. (No model.)

*To all whom it may concern:*

Be it known that we, JOHN H. HAYES, of Appleton, in the county of Outagamie and State of Wisconsin, and CHARLES FISHER, of Chicago, in the county of Cook and State of Illinois, have invented a new and useful Improvement in Fire-Alarm Boxes, of which the following is a description, reference being had to the accompanying drawings, which are a part of this specification.

Our invention has relation to improvements in fire-alarm boxes used in connection with a fire-alarm-telegraph system, comprising a series of signal-boxes at suitable intervals over the city connected in circuit to the central station and a series of alarm-bells.

The primary objects of our invention are:

First. To provide an improved form of circuit-breaking wheel having in its periphery a series of adjusting-screws, which may be regulated so as to contact with or not contact with the make-and-break lever, the screws when operating upon the make-and-break lever allowing a period to elapse before the next ring, said screws permitting the sounding of any alarm, so that in case the number of any particular box is changed the screws can be readily readjusted to sound the new alarm, or in case a box is moved from one locality to another having a different alarm the screws can likewise be readjusted to sound the particular alarm of the new locality.

Second. Considerable annoyance and loss of time is often experienced in the systems now in use through the imperfect working of the locks, the alarm-sender being unable to send the alarm or turn the key, and in many cases the releaser is unable to release the key. It is therefore a further object of our invention to overcome these difficulties, our improved lock being formed of one working part or lever and being so constructed that it is impossible to interfere in any manner with the alarm without locking the key in place, said key being locked one-fourth of an inch before coming in contact with the starting-lever and again locked as soon as said lever is actuated and the alarm started. This mechanism is so arranged that there is no possible chance of catching or binding and is also of such character that the sender of the alarm can in no way prevent the proper number of the box being sounded by the gongs at the stations. The fire-chief, city electrician, or any other person empowered to release the key can do so in a simple and convenient manner.

Third. A further object resides in the more simple character of the working parts over all other boxes now in use, the mechanism being easily understood and safely handled and repaired by any person in the least conversant with the elements of electricity, the apparatus reducing to the minimum the number of gears, shafts, &c., employed, thereby very perceptibly relieving the working parts and reducing wear and liability to accident of any kind to which each and every part is liable and insuring correct and positive action.

Fourth. A further object resides in so constructing and arranging the apparatus that it is entirely free from any injurious effects from electric storms or action of electricity by induction on the connecting-wires, from the crossing or tangling of fire-alarm wires or electric wires of any character, as the working parts can in no manner be interfered with thereby, whether in or out of action. In fact, when out of action there is no current in the box further than to the arrester, and when in action all the parts are perfectly insulated.

With the above primary and other objects in view the invention consists of the devices and parts or their equivalents, as hereinafter more fully set forth.

Figure 2:
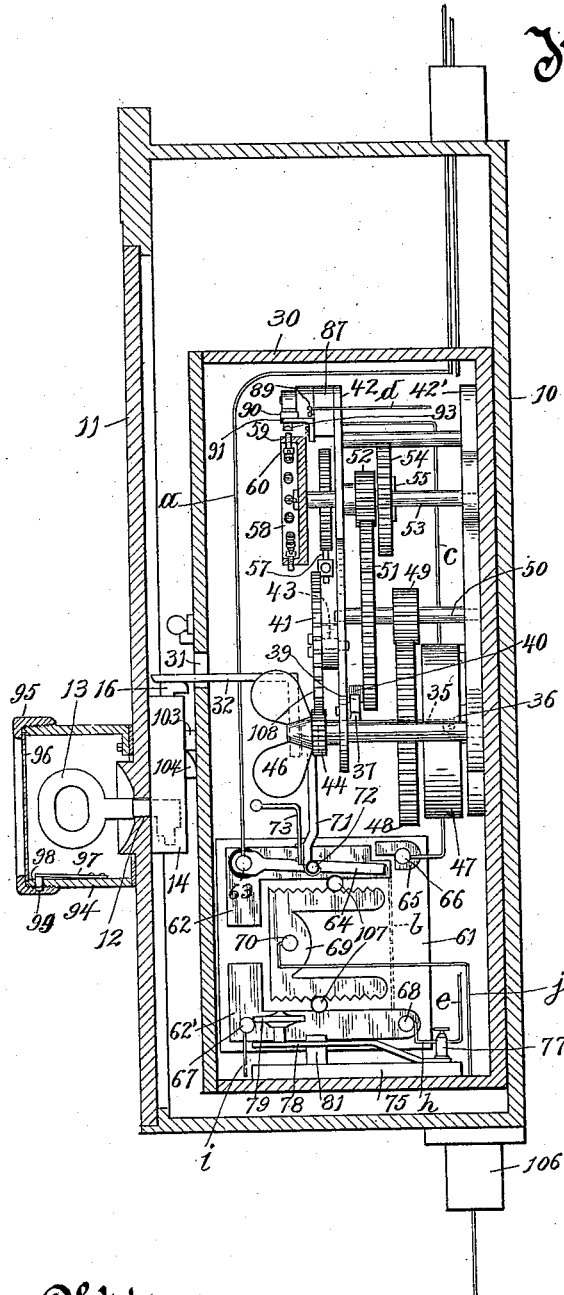
Figure 3:
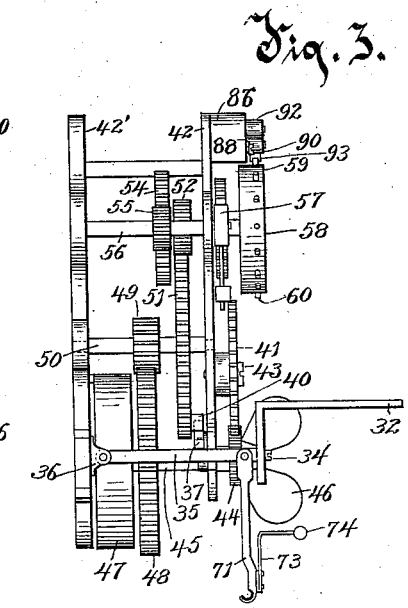
Figure 9:
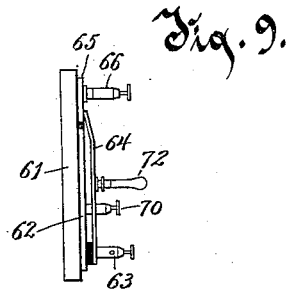

In the accompanying drawings, Figure 1 is an elevation of the complete box with the front of both the outer and inner casings removed. Fig. 2 is a vertical transverse section through Fig. 1, showing one part broken away. Fig. 3 is an edge view of the clock mechanism opposite to that shown in Fig. 2. Fig. 4 is a view of the starting and key-retaining mechanism. Fig. 5 is a view at right angles to Fig. 4 with the casing of the mechanism in section. Fig. 6 is a front view of the keyhole cover with parts broken away. Fig. 7 is a view of the locking mechanism on the end of the outer box engaging a catch extending inwardly from the door of the outer box, the outer and inner boxes being in section and the casing of the locking mechanism also in section and the side of the inner box broken away. Fig. 8 is a plan view of the signaling mechanism. Fig. 9 is a top edge view of the switchboard and lightning-arrester, and Fig. 10 is a diagrammatic view of the box-circuits.

Referring to the drawings, the numeral 10 indicates the outer box or casing, which is of the ordinary construction and provided with a hinged door 11, having a suitable keyhole 12 therethrough, which is adapted to admit of the insertion of a key 13, which enters a casing 14, fixed to the inner side of the door, the hole of the key fitting a pin 15, projecting forwardly from the inner face of the rear wall of the casing, upon which pin the key is adapted to turn. Within the casing 14 is a peculiarly-shaped bar 16, the upper end projecting through an opening in the top of the casing. The lower portion of the bar is reduced somewhat in thickness to form an offset or shoulder 17 at the upper end of said reduced portion. Pivoted on a pin 18, projecting from the reduced portion of the bar, is a dog 19, the free end of said dog normally resting against a pin 20. A spring 21 engages at one end with the dog and at its other end bears against another pin 22.

Extending from the center of one edge of the bar 16 is a projection 23, in the lower edge of which is formed a curved recess 24. A stud 25 extends from a boss 26, formed on the inner face of the rear side of the casing, and this stud receives the coils of a spring 27. One end of the spring is extended up from the coils and bears against the end of the casing, and the other end of the spring is extended over from the coils and bears against a pin 28, extending from the bar 16. When the key 13 is inserted in the keyhole and turned on the pin 15, the bit of the key is free to pass by the dog 19, turning said dog upwardly on its pivot against the action of the spring 21. The moment, however, the end of the bit of the key snaps by the dog the spring 21 acts to force the dog back to its normal position against the pin 20, while the bit of the key becomes confined and locked in the space between the pin 20 and the shoulder or offset 17. Now if the key is turned any farther the bit thereof will press upwardly against the shoulder 17 and cause an up movement of the bar 16 against the action of the spring 27. When the bar 16 has been raised sufficiently high to clear the bit of the key from the point 29, the spring 27 forces the bar 16 downwardly again to its normal position, the key-bit at the same time passing into the recess 24. The key, therefore, is again locked against withdrawal. The effect of the actuation of the bar and the function performed thereby will be more clearly understood from the description which follows.

Within the outer box 10 is an inner box 30. Projecting through an opening 31 in the front of this inner box is the horizontal member of an angular starting-lever 32. The outer end of this starting-lever is in position to be contacted with by the bar 16 when said bar is raised. The downwardly-extending member of the angular starting-lever is provided with an elongated slot 33. Through this slot passes a little screw 34, which enters the end of an arm 35, forming a continuation of the starting-lever. The inner end of this arm is pivoted to a lug 36. It is obvious that the arm 35 could be made in one piece or integral with the vertical portion of the starting-lever. The construction shown, however, is preferable, inasmuch as through the medium of the elongated slot 33 and the screw passing through the same and entering the arm 35 the proper adjustment can be obtained to suit the throw of the key.

The numeral 37 indicates a medially-pivoted lever disposed at right angles to and having one end adapted to rest upon the arm 35. A spring 38 acts against the under edge of the lever 37, near the inner end thereof, and serves to normally hold the outer end down into contact with the arm 35. The inner end of this lever is formed with an upwardly-extending lug 39.

The numeral 41 indicates a toothed index-wheel. A train of gears forming an ordinary clock mechanism is disposed within the inner box. These several gears are mounted upon shafts journaled in the side pieces 42 42' of the clock mechanism. The index-wheel 41 is carried on a short stud or arbor 43, projecting from the side piece 42 of the clock mechanism, and this index-wheel is actuated by means of a pinion 44, carried on the winding stem or arbor 45 of the clock mechanism. The stem or arbor is provided at one extremity with a wing-nut 46 for convenience in turning it, and has also mounted thereon the usual winding-spring 47 and a toothed wheel 48. The teeth of this wheel mesh with the teeth of a pinion 49, carried on a shaft 50, said shaft also carrying a toothed wheel 51, which gears into a pinion 52, mounted on a shaft 53, said toothed wheel 51 provided with a projecting lug 40. Shaft 53 also carries a toothed wheel 54, which engages a pinion 55, carried by a shaft 56, said shaft 56 carrying at its extremity an escapement 57.

The forward end of the shaft 53 carries a circuit-breaking wheel 58, the rim or periphery of which is formed by a forwardly-projecting annular flange 59. This rim is provided with a series of screw-threaded openings which are engaged by small screws 60.

The toothed index-wheel 41, it will be noticed, is provided on its front face with a series of numbers, the present illustration showing said numbers running from "1" to "15." These are for the purpose of indicating to a person at any time exactly how many alarms have been turned in from any particular box, as will hereinafter more fully appear.

A switchboard is secured to one of the side pieces of the inner box, said switchboard consisting of a suitably-insulated base-piece 61 and two L-shaped metallic strips 62 and 62', the former located at the upper end of the base-piece and the latter at the lower end thereof. Extending from the base-board 61 and through strip 62, but perfectly insulated from strip 62, is a binding-post 63, upon which is pivoted a switch-lever 64. The extremity of the longer member of the strip 62 is cut out to permit of an extension from a smaller metallic strip 65, extending therein but not in contact therewith. This metallic strip 65 has extending therefrom a binding-post 66. The L-shaped metallic piece 62' has also projecting therefrom the two binding-posts 67 and 68, located a desired distance apart. Between the metallic strips 62 and 62' is located a lightning-arrester 69, said arrester being preferably of substantial U-shaped form. This lightning-arrester has also projecting therefrom a binding-post 70.

Pivoted to the arm 35 and extending downwardly therefrom is a switch-lever-operating arm 71. The lower end of this arm is formed with a hook to engage a switch-handle 72, projecting from the switch-lever, suitable insulating material being provided between the hook of arm 71 and the handle 72. Connected to the arm 71 is another small arm 73, advisably, although not necessarily, of angular form. The outer end of the arm 73 is provided with a small hard-rubber ball-handle 74, which provides a hand-grasp for operating the arm 73. This arm 73 is for the purpose of disconnecting the operating-arm 71 from the switch-lever 64. It will be readily seen that when disconnected an electrician can examine the box at liberty and run the machinery or examine any part thereof without interfering with the current, as the current is not on the box-circuit until the switch-lever 64 is moved to the metallic strip 65, and if the arm 71 is disengaged from said switch-lever, the latter necessarily cannot be shifted to the strip 65.

To the bottom of the inner box is secured an insulating-block 75. From this block project two binding-posts 76 and 77, respectively. Also secured to the block is an angular metallic spring-strip 78, said strip provided at its extremity with a handle 79. An angle-plate 81 extends up from the insulating-block 75, and the horizontal member thereof extends over in contact with the strip 78, thereby serving as a stop to limit the upward spring of said spring-strip. Within the inner box is also located an electromagnet or testing-coil 82 and a gong 83. The stem 84 of the hammer of this bell is connected to the usual bell-crank armature 85, which armature is actuated by the electromagnet when the current passes therethrough. Connected to the upper edge of the side piece 42 of the clock mechanism are two insulated plates 86 and 87, respectively. Plate 86 carries a binding-screw 88 and plate 87 a similar binding-screw 89. Secured to plate 86 is a make-and-break lever 90, which is normally held down into contact with an angular adjustable contact-plate 91, by means of a spring 92. The make-and-break lever carries a depending finger 93.

If desired, certain persons within the vicinity of a fire-alarm box may be provided with keys similar to 13 for the purpose of turning in the alarm when necessity requires. Under such circumstances each key would be numbered or otherwise properly designated, so that it may be readily determined what particular person has turned in an alarm. As the key after once being inserted and turned cannot be removed, it is obvious that it can be readily determined at once by the person having the releasing-key the particular person who had turned in the alarm, thereby making it possible if a person holding an alarm-key has turned in an alarm when there was no occasion therefor to determine who such person was. The plan of giving to a certain person or persons a key for turning in the alarm, however, is open to serious objection, inasmuch as where the holder of the key keeps it in his house there is danger of its being misplaced, so that valuable time is often lost in finding it. I have therefore shown in Figs. 2 and 6 an arrangement whereby the alarm-key is intended to be left permanently in the keyhole. This consists in providing a casing 94 of any suitable shape, preferably circular, which casing surrounds the keyhole 12 and is secured to the door 11. The outer edge of this casing is provided with screw-threads, which are adapted to be engaged by the threaded rim of a cap 95, said cap provided with a large opening covered by a sheet of transparent material 96, advisably mica. In practice the mica will have printed thereon a warning against breaking the same except in case of fire, with a penalty attached thereto. The wording of such printed matter may be substantially as follows: "$50 fine for interfering with box except in case of fire. When fire occurs, break mica and turn key to right." Secured to the inner side of the casing 94 is a spring-catch 97, the free end of which is bent outwardly and is adapted to pass through an opening 98 in the casing and enter a recess 99 in the rim of the cap. The cap is therefore positively locked in place by the spring-catch and cannot be removed except by breaking the mica. It is obvious that mica is preferable over glass as a cover for the casing 94, as the heat, cold, or elements have no effect on mica and it can be broken by hand without danger of cutting. It will also be seen that the key is locked in place at all times and cannot be removed except when the door 11 is opened, and said door can only be opened by an authorized person having the releasing-key.

The releasing mechanism is shown most clearly in Fig. 7. It consists of a casing 100, secured to the inner side of one of the end pieces of the outer box 10. A keyhole 101 adapts a releasing-key 102 to be passed into the casing. Within the casing is pivoted a latch 103, the outer end of which extends through an opening in the casing and being formed with a depending lug which is adapted to engage a catch 104, extending inwardly from the inner side of the door 11. The latch is normally held in engagement with this catch by means of a spring 105. When the releaser desires to open up the box, either for the purpose of inspecting the interior or for the purpose of removing the alarm-key, he merely turns the releasing-key so that the bit thereof will act on the latch 103 and raise the same out of engagement with the catch 104. The door 11 is then free to be swung open, and when thus open the bar 16 can be raised by grasping the upper end thereof and pulling upwardly thereon. The key 13 can then be turned to the right, which will free it from the recess 24.

Referring now to the electrical connections, the positive wire is indicated by the letter $a$ and is shown as extending downwardly through the top of the outer box and through the top of the inner box to the binding-post 63. It may, however, enter the boxes at any other point. Another wire $b$ connects the L-shaped strip 62 with the opposite L-shaped strip 62'. A wire $c$ connects the binding-post 66 of the strip 65 with the binding-screw 88 of plate 86. A conductor or wire $d$ connects plate 87 with testing-coil or electromagnet 82, and another conductor $e$ extends from said testing-coil or electromagnet to the binding-post 77. Binding-post 77 is connected to strip 81 by means of conductor $f$. A short conductor $g$ connects strip 78 with binding-post 76, and said binding-post 76 is connected with the binding-post 68 by means of a conductor $h$. A return or negative wire $i$ connects with the binding-post 67 and extends upwardly in the inner box and out through the top thereof and also through the top of outer box. This wire, however, may leave the boxes at any point. The binding-post 70 of the lightning-arrester has a ground-wire $j$ connected thereto and leading through a conduit 106 to the ground. Binding-screw 88 is connected to lever 90 by a short wire $k$ and contact 91 with screw 89 by short wire $l$. It is obvious, however, that these connections could be made through brass facing-strips secured to the plates 86 and 87.

In the operation of our invention when an alarm is desired to be turned in an authorized person turns the key 13 to the right, which, as before explained, has the effect of acting on the starting-lever 32. The outer end of this starting-lever is therefore raised, which necessarily has the effect of causing a turning of the medially-pivoted lever 37. The moment this lever is turned it operates on the switch-lever-operating arm 71, so as to lift the same and cause a movement of the end of the switch-lever upwardly, so as to cause the same to move from the position shown in Fig. 2 into contact with the metallic strip 65. The circuit will then be completed as follows: through the positive wire $a$ to binding-post 63, along switch-lever to strip 65, thence by way of conductor $c$ to lever 90, then along the make-and-break lever to contact 91, thence by way of conductors $l$ and $d$ to testing-coil or electromagnet 82, then by conductor $e$ to binding-post 77, from binding-post 77 by way of conductor $f$ to strip 81, along strip 81 to strip 78, from strip 78 along conductor $g$ to binding-post 76, from binding-post 76 by way of wire $h$ to binding-post 68, from binding-post 68 along strip 62' to binding-post 67, and then out by return or negative wire $i$.

The turning of the medially-pivoted lever 37 has also the effect of releasing the lug 39 from engagement with the lug 40 of the wheel 51, which of course permits the train of gears of the clock mechanism to operate, said train of gears finally effecting the turning of the circuit-breaking wheel 58. In the adjustment of the screws of the circuit-breaking wheel shown in the accompanying drawings, first, there are two screws adjusted outwardly far enough to contact with the depending finger 93. Then the next screw is adjusted inwardly farther, so as not to make contact. The next three are adjusted outwardly in contact position. The succeeding screw is adjusted inwardly and the next four screws adjusted outwardly. Each of these outwardly-adjusted screws is adapted to contact with the finger 93, so as to raise the make-and-break lever, and thereby break the connection, and the alarm-bells are adapted to be sounded at the several fire-engine houses and other places each time the circuit is broken. By the adjustment of the screws shown, therefore, the first two screws will cause two rings of the alarm-bells, followed by a slight interval, after which the next three outwardly-adjusted screws will cause three rings to be sounded, followed by an interval, and then the next four screws will cause four rings. The alarm turned in, therefore, will be "234." It is obvious from this explanation that the screws may be readily adjusted to cause the ringing of any particular number which may be given to the box.

Of course when the bar 16 ceases to operate upon the starting-lever 32, which occurs when the key passes into the recess 24, the starting-lever returns to its normal position, and in thus returning allows the spring 38 to act on the medially-pivoted lever 37, so as to cause the inner end of said lever carrying the lug to be again thrown up, so as to be in position to receive the contact of the lug 40 of the wheel 51 and only permit one revolution of said wheel. It will be understood, however, that the gearing is so arranged that with one revolution of the wheel 51 any desired number of revolutions of the circuit-breaking wheel may be obtained. In the present illustration of the invention one revolution of the wheel 51 will permit four revolutions of the circuit-breaking wheel, so that the alarm is sounded on the gongs at the stations four times. The machinery is so regulated that with one winding of the clock mechanism fifteen alarms of four rounds each may be sounded before the necessity of again winding occurs.

The gong 83 is arranged within the circuit, so that the sender of the alarm may hear the same repeated and be thereby assured that the alarm has been properly sent. It will be understood that when the circuit is complete through the electromagnet the armature is up against the magnet, and when the circuit is broken by the make-and-break lever the magnet releases the armature and the bell is thereby, of course, sounded and at the same time all of the bells on the circuit are sounded.

It will be understood that with one complete revolution of the toothed wheel 51 the index-wheel only moves two teeth, or the distance of the spaces between the several numbers of the index-wheel, and that the toothed wheel 51 is prevented from making more than one complete revolution by the engagement of the lug 39 of the medially-pivoted lever 37 with the lug 40 of wheel 51. It can therefore be readily determined by any one inspecting the interior of the box just how many alarms have been turned in, the first number to the right of the lower central portion of the index-wheel indicating how many alarms have been sounded.

When the box is not in operation and the switch-lever 64 is in the position shown in Fig. 2 of the drawings, the flow of the current is as follows: through the positive wire a to the binding-post 63, along switch-lever 64 to wire b, along wire b to strip 62', along said strip 62' to binding-post 67, and thence out by the return-wire i. It will therefore be seen that when the box is out of action the current only passes to the lower end of the box and thence out by the return-wire i and does not flow up to the lever 90 in order to complete the circuit around the top of the box. The machinery within the box is therefore entirely free from any injurious effects from electric storms or action of the elements of electricity by induction or otherwise, especially when the box is not in action, for, as previously stated, the current in such case only passes through the lower part of the box and out through the return-wire i, and does not therefore pass out through the machinery or working parts, whereby said parts are protected from the effects of a current constantly passing therethrough.

The arrester 69 is for the purpose of taking an overcharge of electricity or an abnormal current caused by lightning or other causes, said overcharge being taken up by the arrester and passing therefrom through the wire j to the ground.

The contacting strips 78 and 81, the former provided with the finger-piece 79, are employed for the purpose of signaling for any purpose—as, for instance, for more assistance, more pressure, &c., or for any private signaling, the strip 78 being the signaling-key. It will be understood that the signaling-key breaks the same circuit that the make-and-break lever 90 breaks. It will be obvious that by pressing down on the finger-piece 79 the strip 78 may be brought out of contact with the strip 81 and the circuit thus broken.

It will be seen that our invention is such that all the parts are made easy of access for examination and any part of the machinery may be removed without interfering with any of the other parts. It is to be further noted that if it is found necessary at any time to remove for any cause whatever the machinery the danger of unannounced fire from the locality of removal is entirely obviated by holding in reserve one inner box and set of machinery, which can replace removed machinery, and the desired number of the alarm at once formed by adjusting the screws.

The outside connections employed by us are also far superior to ones now used, as in our construction there are no threads, nuts, or screws of any kind to rust or break, the connections being adapted to slip in and out of place with a sliding motion and allowing for the removal of the inner box without interfering with the ground or overhead wires.

It will be understood that when switch-lever 64 is thrown over to strip 65 it is held in contact therewith by reason of the spring-power contained in itself, and that after the bar 16 ceases to contact with the starting-lever 32 said lever necessarily resumes its normal position. At the same time the switch-operating arm 71 also resumes its normal position, but does so without returning the switch-lever, therefore leaving said switch-lever in contact with strip 65. When it is desired to again have switch-lever in position shown in Fig. 2, this may be accomplished by hand or may be accomplished automatically by any desired and convenient means.

It will be seen that the space between the L-shaped strip 62 and the strip 65 is of such limited character that when the switch moves over from the position shown in Fig. 2 toward the strip 65 it will make contact with said strip 65 before it finally leaves strip 62, and on the reverse movement the same action takes place—that is to say, it makes contact with strip 62 before it finally leaves strip 65. It is obvious from this that the current is never broken through the operation of the switch-lever, and that on the movement of said lever to strip 65 the current is completed through the make-and-break lever 90, and when in contact with strip 62 the current does not go to lever 90, but is completed through wire b, strip 62', and return i.

The numerals 107 107 indicate two holes which are adapted to receive metallic cut-out plugs, so as to connect the strips 62 and 62' with the lightning-arrester. When the plugs are inserted, the entire current is grounded whenever it may be desirable to do so.

It will also be seen that the index-wheel 41 has one of its teeth 108 enlarged, so as to stop spring being wound at the proper tension.

What we claim as our invention is—

1. The combination, of a box or casing provided with a keyhole, an interior vertically-sliding bar provided on its face with a shoulder, said shoulder adapted to be acted upon by the bit of a key insertible through and rotatable in the keyhole, whereby the bar is raised vertically, and said bar also provided on its face with a recess, said recess arranged in the arc of a circle described by the bit of the key, as said key is turned, the bar, after the bit of the key passes beyond the shoulder, adapted to drop by gravity and thereby bring its recess into engagement with the bit of the key, whereby the key is locked in the recess against turning in either direction, and mechanism acted upon by the bar, when said bar is slid upwardly by the key.

2. The combination, of a box or casing provided with a keyhole, an interior longitudinally-movable bar having a shoulder, said shoulder adapted to be acted upon by a key inserted through the keyhole, whereby the bar is moved longitudinally, and said bar also provided with a recess extending from the point where the shoulder terminates, and into which recess the bit of the key, after passing the end of the shoulder, is adapted to enter and to be locked therein, the bar returning to its normal position after the bit of the key enters the recess, a dog pivoted to the bar below the shoulder thereof, a pin against which the lower edge of the dog normally rests, the bit of the key, when said key is turned in one direction, adapted to turn said dog on its pivot so as to permit the key to pass into the space between the dog and the shoulder, and to be confined in said space against back turning, and mechanism acted upon by the bar, when said bar is moved longitudinally by the key.

3. The combination, of a box having a side thereof provided with a key-opening, a casing extending out from the side of the box and surrounding the key-opening, the outer end of the casing being threaded, a cap provided with threads engaging the threads of the casing, said cap having an opening covered by transparent material, and a spring-catch within the receptacle, said catch adapted to pass through an opening in the casing and to engage a recess in the cap.

4. The combination, of an outer box, a make-and-break device, provided with a keyhole for the insertion of a key, a bar within the outer box, said bar provided with a projection or shoulder against which the key is adapted to act to cause a longitudinal movement of the bar, and said bar also provided with a recess into which the key passes, after being turned a desired distance, the bar returning to its normal position after the key has passed into the recess, an inner box, a starting-lever pivoted therein and extending through an opening in the side thereof, said starting-lever adapted to be acted upon by the bar upon the longitudinal actuation of said bar by the key, and mechanism within the inner box adapted to be acted upon by the starting-lever.

5. In a fire-alarm box, the combination, of a circuit-breaking wheel, an electrical circuit, a make-and-break lever within the circuit adapted to be acted upon by the circuit-breaking wheel, a toothed index-wheel having indices upon its face, said index-wheel mounted upon a short shaft or arbor, a spring-wound winding-arbor having a pinion mounted thereon meshing with the toothed periphery of the index-wheel, and also having mounted thereon a toothed wheel, another shaft having mounted thereon a pinion with which the last-mentioned toothed wheel meshes, and said shaft also carrying thereon a toothed wheel having a lug projecting from the face thereof, other gears actuated by the last-mentioned toothed wheel, and adapted for rotating the circuit-breaking wheel one complete revolution with each predetermined partial rotation of the index-wheel, a lever adapted normally to engage the lug projecting from one of the toothed wheels to prevent the train of gears from rotating, and means for operating the pivoted lever.

6. In a fire-alarm box, the combination, of an electrical circuit, a switchboard, electrical conductors leading from different contacts of the switchboard, a switch-lever pivoted to the board, an arm connected to the switch-lever, and a starting-lever for actuating the switch-operating arm.

7. In a fire-alarm box, the combination, of an electrical circuit, a switchboard, electrical conductors leading from different contacts of the switchboard, a switch-lever pivoted to the board, an arm connected to the switch-lever and adapted to operate the same, an auxiliary arm attached to the switch-operating arm, and adapted to provide for disconnecting the same from the switch-lever, and a starting-lever for actuating the switch-operating arm.

8. In a fire-alarm box, the combination, of switch mechanism having two electrically-connected strips, and an auxiliary strip arranged at a slight distance from but not in contact with one of the electrically-connected strips, a switch-lever carried by one of said electrically-connected strips, the lever having electric contact with the strip only at one point, said lever, when swung over in one direction from the strip to which it is pivoted, adapted to make contact with the auxiliary strip, means for operating the switch-lever, an electrical circuit comprising a positive wire extending to the switch-operating lever, a return-wire leading from the strip which is electrically connected to the strip carrying the switch-lever, and another conductor leading from the auxiliary strip of the switch mechanism, and making connection with the strip of the switch mechanism from which the return-wire leads, the latter conductor forming a complete circuit from the auxiliary strip to the strip from which the return-wire leads when the switch-lever is in contact with said auxiliary strip, and said conductor being out of circuit when said switch-lever is not in contact with the auxiliary strip, the circuit in this instance being completed through the electrically-connected strips of the switch mechanism.

9. The combination, of a switch mechanism, having two electrically-connected strips, and an auxiliary strip arranged at a slight distance from, but not in contact with, one of the electrically-connected strips, a switch-lever carried by one of said electrically-connected strips, the lever having electrical contact with the strip only at one point, said lever, when swung over in one direction from the strip to which it is pivoted, adapted to make contact with the auxiliary strip before it finally leaves the strip to which it is pivoted, and vice versa, means for operating the switch-lever, an electrical circuit comprising a positive wire extending to the switch-operating lever, a return-wire leading from the strip which is electrically connected to the strip carrying the switch-lever, and other conductors leading respectively from the auxiliary strip of the switch mechanism to the make-and-break device, and from the contact of the make-and-break device to the strip of the switch mechanism from which the return-wire leads, the latter conductors forming a complete circuit to and from the make-and-break device, when the switch-lever is in contact with the auxiliary strip, and said conductors being out of circuit when said switch-lever is not in contact with the auxiliary strip, the circuit in this instance being completed through the electrically-connected strips of the switch mechanism.

10. The combination, of a switch mechanism having two electrically-connected strips, and an auxiliary strip arranged at a slight distance from, but not in contact with, one of the electrically-connected strips, a switch-lever carried by one of said electrically-connected strips, the lever making contact with its strip only at one point, and said lever, when swung over from the strip to which it is pivoted, adapted to make contact with the auxiliary strip before its contact-point finally leaves the strip to which it is pivoted, and vice versa, means for operating the switch-lever, an electrical circuit, comprising a positive wire extending to the switch-operating lever, a return-wire leading from the strip which is electrically connected to the strip carrying the switch-lever, and another conductor leading from the auxiliary strip of the switch mechanism and making connection with the strip of the switch mechanism from which the return-wire leads, the latter conductor forming a complete circuit from the auxiliary strip to the strip from which the return-wire leads, when the switch-lever is in contact with said auxiliary strip, and said conductor being out of circuit when said switch-lever is not in contact with the auxiliary strip, the circuit in this instance being completed through the electrically-connected strips of the switch mechanism, and a signaling-key in the circuit.

11. The combination, of a make-and-break device, switch mechanism having two electrically-connected strips, and an auxiliary strip arranged at a slight distance from, but not in contact with, one of the electrically-connected strips, a switch-lever carried by one of said electrically-connected strips, the lever making contact with its strip only at one point, and said lever, when swung over from the strip to which it is pivoted, adapted to make contact with the auxiliary strip before its contact-point finally leaves the strip to which it is pivoted, and vice versa, means for operating the switch-lever, an electrical circuit, comprising a positive wire extending to the switch-operating lever, a return-wire leading from the strip which is electrically connected to the strip carrying the switch-lever, and other conductors leading from the auxiliary strip of the switch mechanism to the make-and-break device, and from the contact of the make-and-break device to the strip of the switch mechanism from which the return-wire leads, the latter conductors forming a box-circuit, when the operating-lever is in contact with the auxiliary strip, and said conductors being out of circuit when said switch-lever is not in contact with the auxiliary strip, the circuit in this instance being completed through the electrically-connected strips of the switch mechanism, and an alarm in the circuit of the make-and-break device, and adapted to be sounded as said make-and-break device is actuated to cause a breaking of the current.

In testimony whereof we affix our signatures in presence of witnesses.

JOHN H. HAYES.
CHARLES FISHER.

Witnesses for Hayes:
GEORGE C. JONES,
GEORGE MCNAMEE.
Witnesses for Fisher:
M. M. QUINN,
A. W. SYNWOLT.